F. C. WILHELM & S. STROMMER.
SPEED RECORDING MECHANISM.
APPLICATION FILED MAY 18, 1916.

1,260,112.

Patented Mar. 19, 1918.
4 SHEETS—SHEET 1.

WITNESS
R. Hamilton

INVENTORS:
F. C. Wilhelm.
and S. Strommer
BY
Chas. W. Gerard
their ATTORNEY

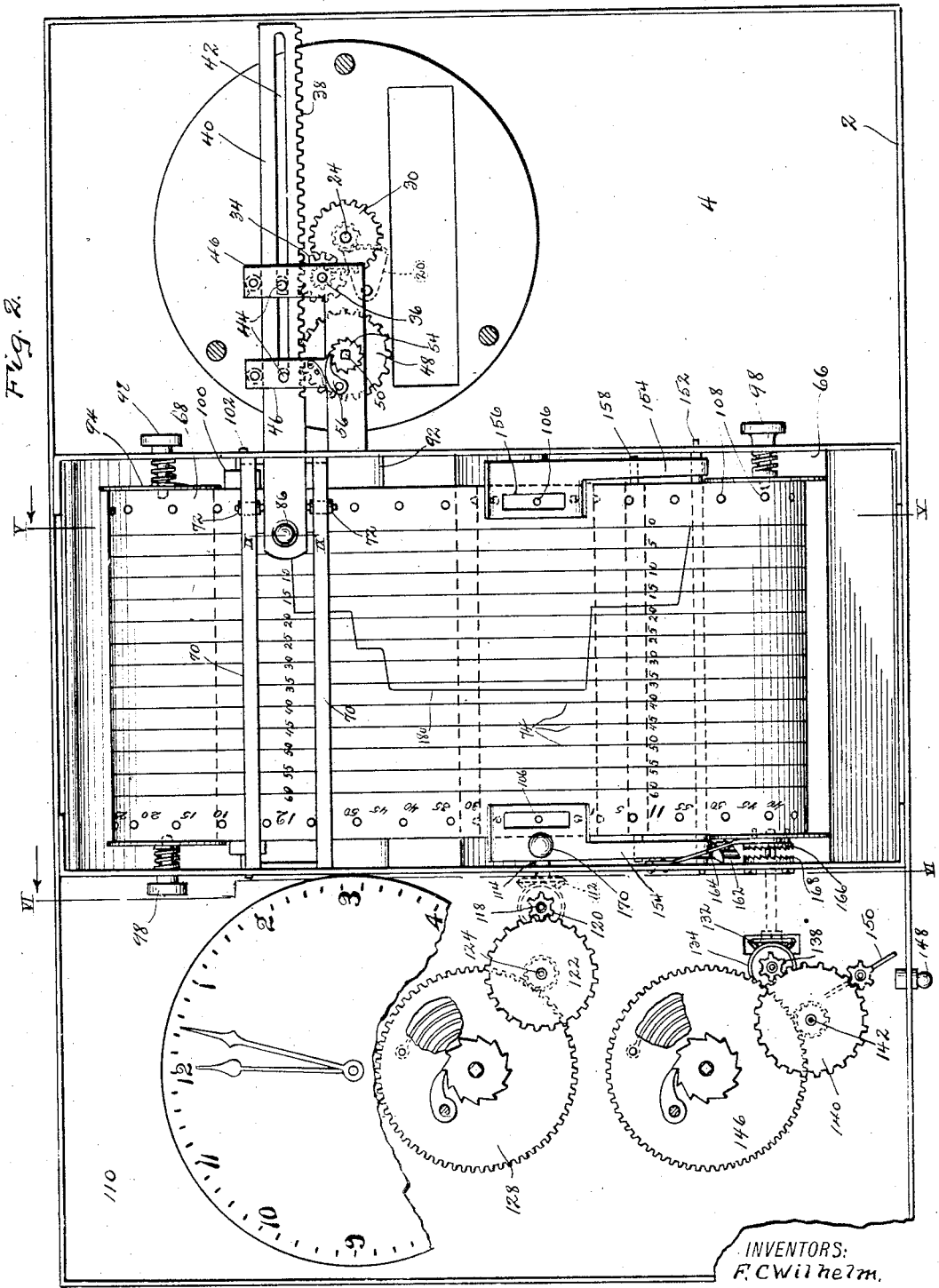

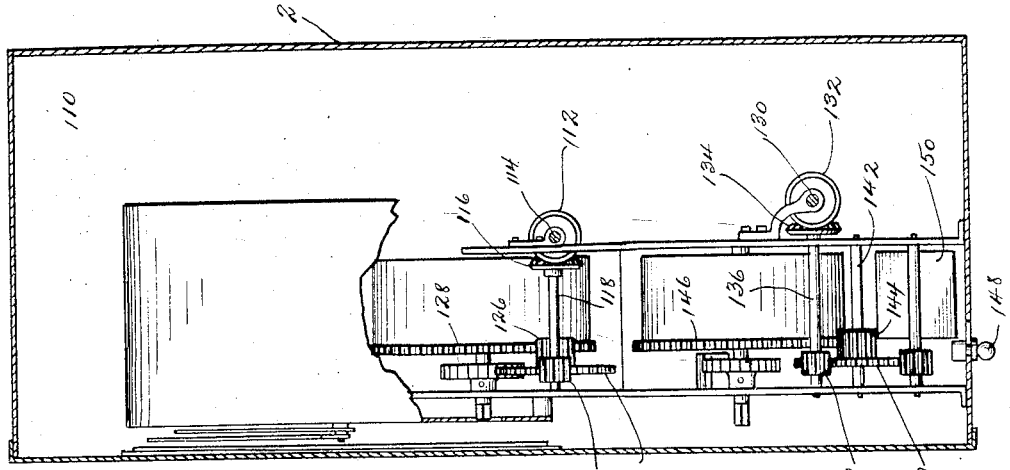
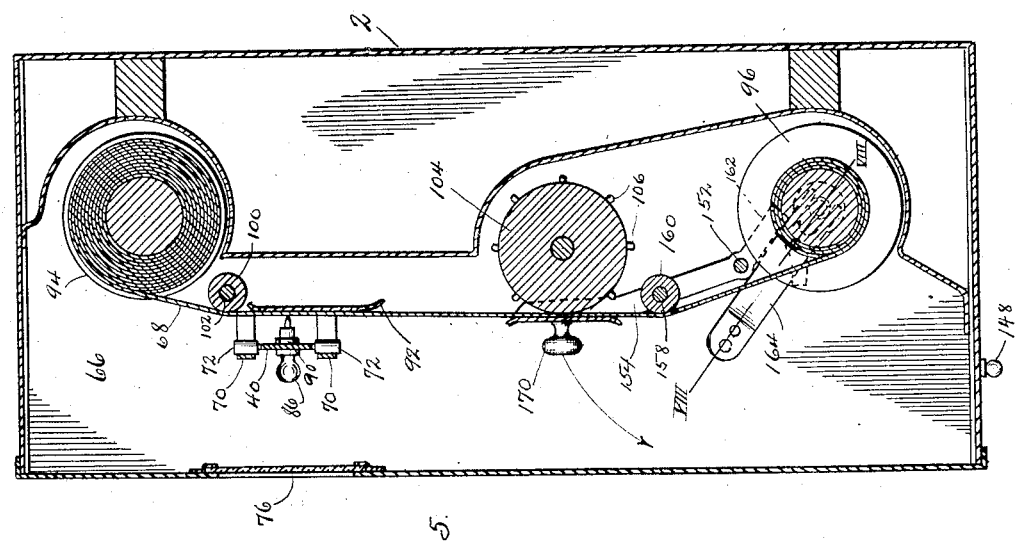

F. C. WILHELM & S. STROMMER.
SPEED RECORDING MECHANISM.
APPLICATION FILED MAY 18, 1916.
1,260,112.
Patented Mar. 19, 1918.
4 SHEETS—SHEET 4.
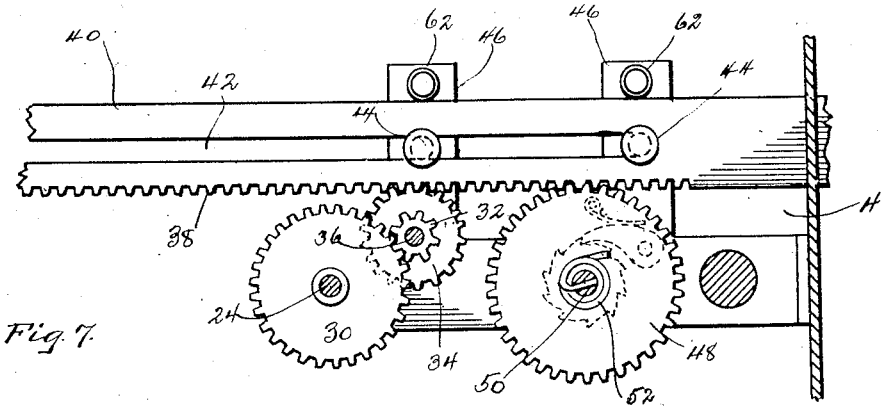
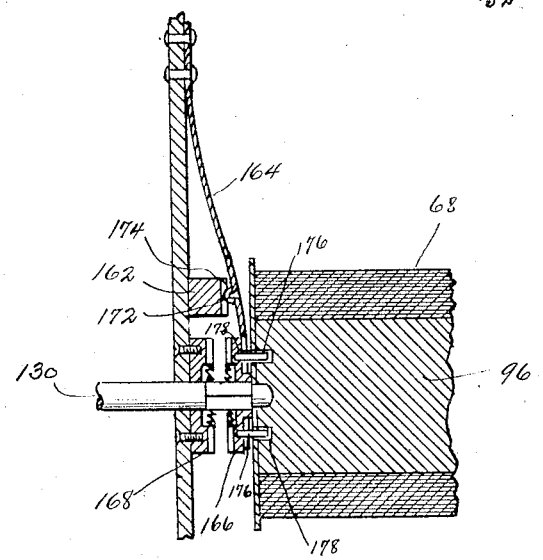
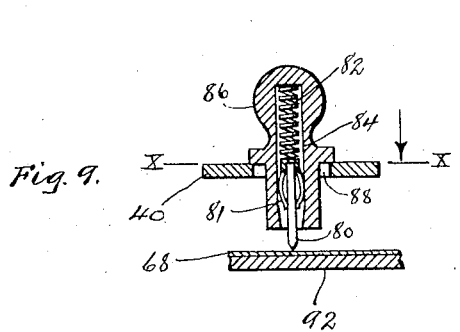
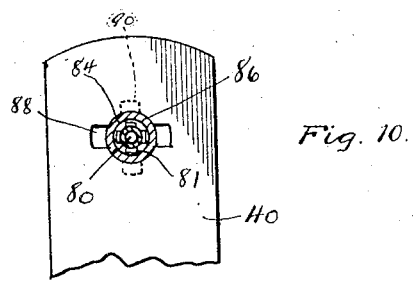
WITNESS:
R. E. Hamilton
INVENTORS:
F. C. Wilhelm
and S. Strommer
BY
Chas. O. Gerard
ATTORNEY

UNITED STATES PATENT OFFICE.

FREDERICK C. WILHELM AND SIGFRID STROMMER, OF KANSAS CITY, MISSOURI.

SPEED-RECORDING MECHANISM.

1,260,112.   Specification of Letters Patent.   Patented Mar. 19, 1918.

Application filed May 18, 1916. Serial No. 98,320.

*To all whom it may concern:*

Be it known that we, FREDERICK C. WILHELM, a citizen of the United States, and SIGFRID STROMMER, a subject of the Czar of Russia, both residing at Kansas City, in the county of Jackson and State of Missouri, have invented certain new and useful Improvements in Speed-Recording Mechanism, of which the following is a full and exact specification.

The present invention relates to recording devices, and a special object in view is to provide an improved mechanism for obtaining a complete record of the speed of a moving element for a given period of time. The means herein provided is especially adapted for recording the speed of a rotating element, being particularly designed with reference to the rotating shafts of speed-registering devices which are commonly provided with governors for operating the speed index. For carrying out the invention, use is made of a movable recording member actuated in unison with the governor member, together with a record sheet suitably mounted upon rollers and moved continuously at a uniform speed by means of a clock mechanism arranged in operative relation with one of the rollers.

With this general object in view, and other minor objects as will hereinafter appear, the invention will now be described with reference to the accompanying drawings illustrating a form of construction and arrangement which has been devised for carrying the invention into practice, after which those features and combinations deemed to be novel will be severally set forth and defined in the appended claims.

In the said drawings—

Fig. 2 is a similar view on a larger scale, with the cover plate or door removed and certain parts being shown as partly broken away or in section;

Figs. 5 and 6 are sections on the lines V—V and VI—VI, respectively, of Fig. 2;

Fig. 7 is a section on the line VII—VII of Fig. 3, on a larger scale;

Figs. 8 and 9 are sections taken on the lines VIII—VIII and IX—IX of Figs. 5 and 2, respectively, but on enlarged scales; and Fig. 10 is a section taken on the line X—X of Fig. 9.

Figure 3:
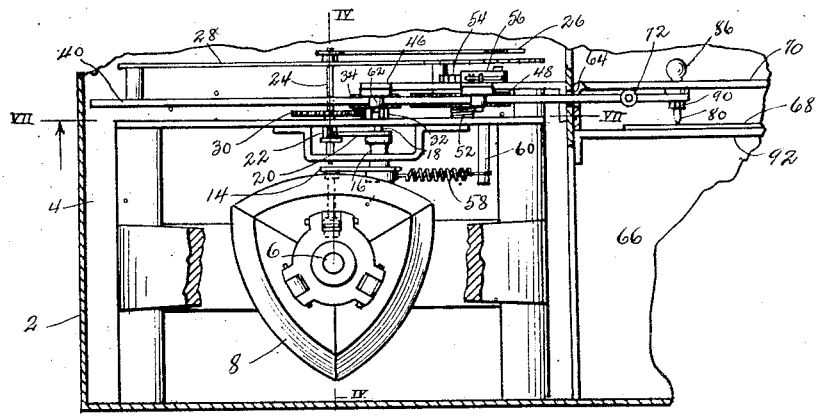
Fig. 3 is a detail elevation of the interior of a portion of the speed-registering part of the apparatus, showing connections to the recording member.
Figure 4:
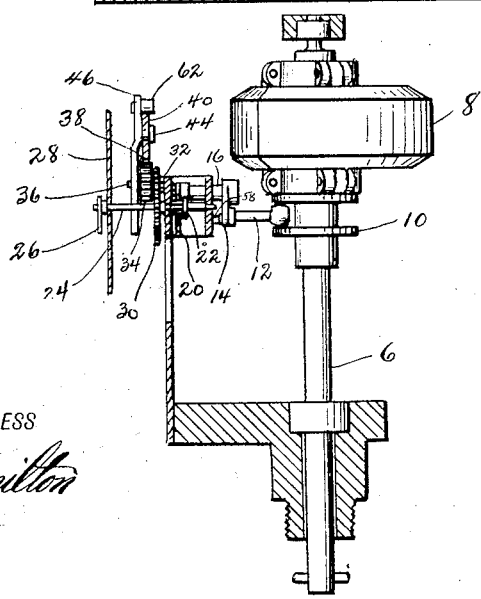
Fig. 4 is a section taken along the line IV—IV of Fig. 3.

Referring to the drawings in detail, these illustrate a casing 2 within one compartment, 4, of which is mounted the element whose speed is to be recorded, the same being in the present case the rotary shaft member 6 forming a part of a common type of "speedometer" used on motor-driven vehicles. This shaft 6 carries a centrifugal governor 8, the swinging sections of which are pivoted to a sliding collar 10 having engagement with one end of the arm 12 projecting from the oscillating or rocker arm or lever 14. The lever 14 is fixed to one end of a sleeve 16 mounted on a short shaft 18, the opposite end of the sleeve being secured to a gear segment 20 which is in mesh with a pinion 22 secured to the index shaft 24, the latter being provided with the speed index 26 movable over the dial 28. A gear wheel 30 is also secured to the shaft 24 and engages a pinion 32 forming the hub of a gear wheel 34 journaled on the pin 36 and meshing with a rack 38 formed on one of the longitudinal edges of the recording member or bar 40. This bar is provided with a longitudinal guide slot 42 coöperating with pins 44 in the guideways 46, the bar being held normally at one limit of its movement (its zero position as illustrated in Fig. 2) partly by the contracting action of the governor 8 and also by the action of a gear wheel 48 mounted on the shaft pin 50 and in engagement with the rack 38, said gear wheel being under the influence of a coil spring 52 and the shaft 50 carrying a ratchet wheel 54 in engagement with a pawl 56 whereby the spring tension may be varied. If desired, an additional spring element may be provided intermediate the governor and wheel 48, comprising a coil spring 58 secured at its opposite ends, respectively, to a fixed pin 60 and to a suitable projection from the sleeve 16, as illustrated in Fig. 3. Within the guideways 46 are also provided bearing rollers 62 for engagement with the smooth edge of the bar 40.

Figure 1:
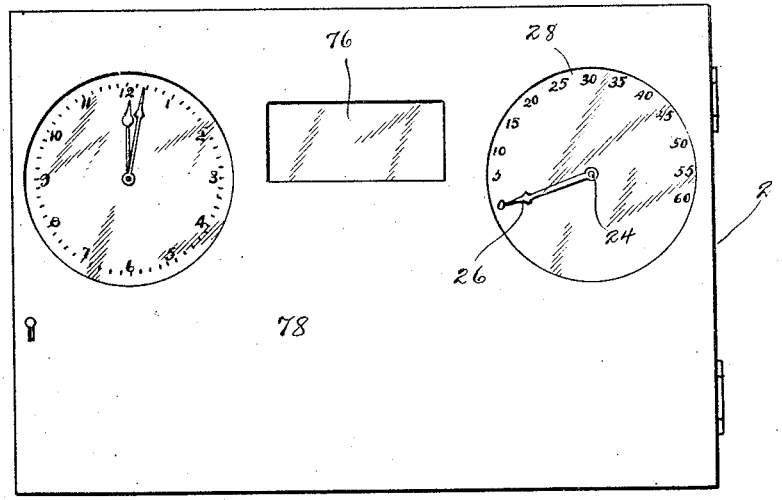
Figure 1 is a plan showing a face view of the apparatus.

The bar 40 projects through an opening 64 into a middle compartment 66 in which the record sheet 68 is mounted and operated. The bar 40 moves transversely with reference to said sheet and between a pair of track-bars 70, said bar being provided with the lateral rollers 72 for engagement with the under surface of said track-bars. As will be seen by reference to Fig. 2, the record sheet 68 is divided by the spaced longitudinal lines or ruling 74 to form a graduated speed scale increasing from right to left across the sheet, one margin of which is also provided with a series of time markings representing 5-minute intervals, the sheet being of a length suitable for covering the total interval of time for which the clock mechanism (hereinafter described) is adapted to drive the sheet, preferably an interval of at least one week. The movements of the end of the bar 40 across the sheet 68 are visible through the window 76 (Figs. 1 and 5) provided in the door 78 of the casing, said bar being provided with the pencil 80 or equivalent marking device; the drawings illustrate the pencil 80 as held by a clasp member 81 pressed yieldingly by a spring 82 within a socket 84 of a holder 86 (Fig. 9) mounted in the irregularly shaped opening 88 adjacent the end of bar 40, said holder being formed with lugs 90 (Fig. 5) adapted, on giving the holder a quarter turn, to engage the under surface of the bar (Fig. 10) and maintain the holder in place. As the sheet 68 traverses the window space, it moves over a supporting plate 92 extending across the compartment 66.

The record sheet 68 is unwound from a delivery roller 94 from which it is led to a receiving roller 96 at the opposite end of the compartment 66, these rollers being removably mounted in any suitable manner, as by means of the spring pressed pins 98. An idler roll 100, journaled on a rod 102, is provided for guiding the sheet on to the supporting plate 92. Intermediate said plate and the receiving roller the sheet 68 is carried over a driving roller 104, the opposite ends of which are provided with teeth or spurs 106 for engaging in the series of perforations 108 punched in the margins of the sheet, whereby movement of the latter is effected by the action of a clock-works mounted in the compartment 110 at the left of compartment 66. The clock mechanism may be of the usual construction and the driving connection made by providing a bevel gear 112 on the shaft 114 of the roller 104, which gear 112 meshes with a similar gear 116 on the shaft 118, the latter carrying a pinion 120 in mesh with a gear wheel 122 mounted on a shaft 124 provided with a pinion 126 meshing with the drum gear 128 of the clock mechanism. The gearing is such as to time the movement of the record sheet in accordance with the time markings above referred to.

Similar provision is made for effecting proper winding of the record sheet on the receiving roller 96, the same comprising a shaft 130 having the squared end (see Fig. 8) adapted to be clutched with the roller 96 as hereinafter explained,—said shaft having a bevel gear 132 meshing with a similar gear 134 on a shaft 136 provided with a pinion 138 meshing with a gear wheel 140 mounted on a shaft 142 provided with a pinion 144 which meshes with the driving drum gear 146 of a suitable clock mechanism. A stop member 148 is slidingly mounted in the casing 2 for movement into and out of the path of the fan member 150 of said mechanism (see Fig. 6) whereby the action of this drive mechanism may be arrested at will.

For holding the record sheet 68 in proper engagement with the drive roller and also for lifting the sheet out of engagement therewith and simultaneously unclutching the roller 96 and locking its drive mechanism, the following construction is provided. Intermediate the rollers 96 and 104 is a transverse rod 152 serving as a pivotal support for the arms 154, the free ends of which rest upon the top surface of the sheet 68 and hold the same in engagement with the teeth or spurs 106, oblong openings 156 being provided in said arms for clearing said teeth. On a rod 158 connecting said arms is journaled an idler roller 160 for supporting and guiding the sheet 68 in its movement to the receiving roller 96 and for disengaging said sheet from the roller 104 when said arms are raised for adjusting the sheet. One of the arms 154 is formed with an extension having a wedge or cam-like surface 162 for engagement with a leaf spring 164 which acts normally to move a clutch member 166 on the squared portion of the shaft 130 into locking engagement with a fixed clutch element 168 secured to the casing 2 (see Fig. 8). A thumb piece 170 is provided on one of the arms 154 for convenience in lifting the same, and for holding the parts with the sheet disengaged from the roller 104 a knob or projection 172 is formed on the spring 164 for engagement with a notch or recess 174 in the wedge portion 162. The movable clutch member 166 is provided with the pins 176 movable into and out of the recesses 178 of the roller 96, and the length of these pins and the teeth of the clutch elements are so proportioned that, on operating the arms 154, the shaft 130 will be locked before the roller 96 is unclutched.

The operation of the apparatus will be clear from the foregoing description. As the shaft 6 is rotated by movement of the part from which it is driven, the sections of the governor 8 are of course spread, thereby actuating the arm 12 and the connected train of gearing to the recording member 40. This results in inscribing a graph or speed curve 180, in an obvious manner, upon the record sheet 68, which latter is continuously and uniformly moved by its connected clock mechanism, and thereafter wound upon the receiving roller by means of the described actuating means therefor. With the parts properly set in correct initial working order, having the time indicated by the recording sheet corresponding to that registered by the clock mechanism (see Fig. 2), the apparatus will then record and preserve an accurate record of the movements of the speed element for the entire period for which the record sheet is adapted, as will be clearly understood. As just indicated, it is of course essential that the time markings of the sheet in register with the recording member at any given time should agree with the time registered by the clock at that moment, and for adjusting the sheet to this end the same is lifted out of engagement with the driving roller 104 by manipulation of the arms 154; this acts to disengage the sheet from said roller, and simultaneously unclutches the receiving roller 96 and locks its actuating mechanism as already explained, and the receiving roller 96 may now be rotated freely for moving the record sheet the requisite distance for obtaining the proper time relation. On returning the arms 154 to original position, this of course results in restoring the sheet 68 to engagement with the roller 104, as well as reclutching of the receiving roller 96 and unlocking of its actuating mechanism by the action of the spring 164.

While the foregoing represents what is now deemed to constitute the preferred form of embodiment of the present invention, the right is reserved to all such formal changes and modifications as may fairly fall within the scope of the following claims.

1. A recording mechanism comprising, in combination with a rotating member, a continuously moving record sheet, a governor responsive to the movements of said member, a recording member comprising a sliding rack-bar movable in a direction transverse to the path of travel of said sheet, connections between said bar and governor for actuating said bar from the governor, and a spring-actuated gear independent of said connections and meshing with said bar for actuating the latter yieldingly in opposition to the action of said governor.

2. A recording mechanism comprising, in combination, a rotating member, a continuously moving record sheet, a governor responsive to the movements of said member, a recording member comprising a sliding bar formed with a rack along one of its side edges, a gear in mesh with said rack and operated from said governor, and a second spring-actuated gear mounted independently of said first gear and in mesh with said rack for actuating said bar in opposition to the action of said governor.

3. A recording mechanism comprising, in combination, a rotating member, a continuously moving record sheet, a governor responsive to the movements of said member, a pair of spaced track members extending across said sheet in a direction transverse to the path of its travel, a recording member comprising a sliding bar actuated from said governor, said bar extending parallel to said track members and between the latter and said sheet, and a pair of rollers carried by the opposite sides of said bar in engagement with the under faces of said track members.

4. A speed recording mechanism comprising, in combination, a continuously moving record sheet, a governor-actuated recording member comprising a slide bar moving transversely with reference to the path of travel of said sheet and provided with a marker held yieldingly in engagement with said sheet, track members extending across said sheet parallel to said bar, and rollers carried by said bar in engagement with the under faces of said track members.

5. A speed recording mechanism comprising, in combination, a moving member, a record sheet provided with a receiving roller and a delivery roller for carrying said sheet, means for actuating said receiving roller for winding said sheet thereon, a driving roller engaging the sheet intermediate said receiving and delivery rollers and provided with mechanism for actuating the same at a uniform speed, means for holding the sheet in engagement with said driving roller, means operated by movement of said holding means for clutching said receiving roller with its actuating means, and a recording member responsive to the movements of said first member for marking a speed graph on said sheet.

6. A speed recording mechanism comprising, in combination, a moving member, a record sheet provided with a receiving roller and a delivery roller for carrying said sheet, means for actuating said receiving roller for winding the sheet thereon, a driving roller engaging the sheet intermediate said receiving and delivery rollers and provided with mechanism for actuating said driving roller at a uniform speed, means for holding the sheet in engagement with said driving roller, means operating automatically on shifting of said holding means to unclutch said receiving roller and lock its actuating means, and a recording member responsive to the movements of said first member for marking a speed graph or curve on said sheet.

7. A speed recording mechanism comprising, in combination, a moving member, a record sheet provided with a receiving roller and a delivery roller for carrying said sheet, means for actuating said receiving roller for winding said sheet thereon, a driving roller engaging the sheet intermediate said receiving and delivery rollers and provided with mechanism for actuating said driving roller at a uniform speed, means for disengaging said sheet from said driving roller, means operated by movement of said disengaging means for clutching said receiving roller with its actuating means, and a recording member responsive to the movements of said first member for marking a speed graph or curve on said sheet.

8. A speed recording mechanism comprising, in combination, a moving member, a record sheet provided with a receiving roller and a delivery roller for carrying said sheet, means for actuating said receiving roller for winding said sheet thereon, a driving roller engaging the sheet intermediate said receiving and delivery rollers and provided with mechanism for actuating said driving roller at a uniform speed, means for disengaging said sheet from said driving roller, means operating automatically and simultaneously with the operation of said disengaging means to unclutch said receiving roller and lock its actuating means, and a recording member responsive to the movements of said first member for marking a speed graph or curve on said sheet.

FRED. C. WILHELM.
S. STROMMER.